United States Patent [19]

Stern

[11] Patent Number: 4,629,324
[45] Date of Patent: Dec. 16, 1986

[54] ARRANGEMENT FOR MEASURING DEPTH BASED ON LENS FOCUSING

[75] Inventor: Howard Stern, Greenlawn, N.Y.

[73] Assignee: Robotic Vision Systems, Inc., Hauppauge, N.Y.

[21] Appl. No.: 566,687

[22] Filed: Dec. 29, 1983

[51] Int. Cl.⁴ ............................................. G01B 11/24
[52] U.S. Cl. ..................................................... 356/376
[58] Field of Search ...................... 356/375, 376, 127; 250/201 AF

[56] References Cited

U.S. PATENT DOCUMENTS

| | | | |
|---|---|---|---|
| 3,481,672 | 12/1969 | Zoot | 356/375 |
| 4,153,834 | 5/1979 | Hayamizu | 250/227 |
| 4,209,252 | 6/1980 | Arditty et al. | 356/124 |
| 4,320,462 | 3/1982 | Lund et al. | 356/121 |

Primary Examiner—R. A. Rosenberger
Attorney, Agent, or Firm—Max Fogiel

[57] ABSTRACT

A pattern of light is projected upon a surface to be measured which may be devoid of surface detail. A sharply focused image of the surface provides distance discrimination. Although the projected pattern may be separate from the imaging optics, a common optics path removes distortion, provides maximum sensitivity and eliminates processing for misalignment between projector and imager. Sequential cross-correlation, synchronous detection or percent modulation processing methods may be readily implemented to develop three-dimensional co-ordinates relative to the sensor for all in-focus regions of the image. Refocusing the lens provides depth coverage.

5 Claims, 9 Drawing Figures

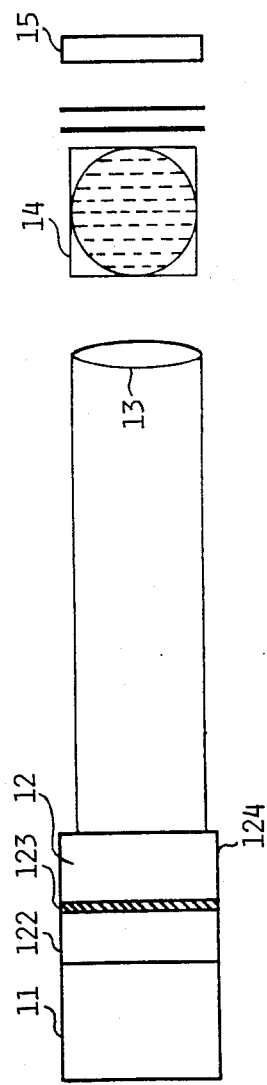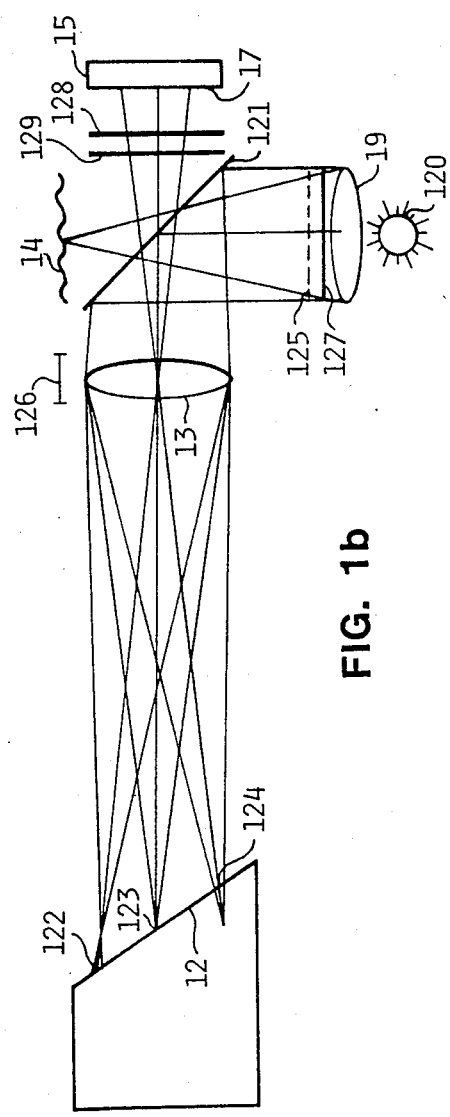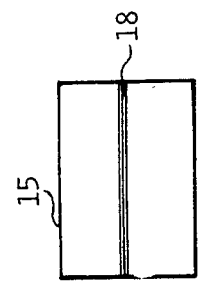
FIG. 1a
FIG. 1b
FIG. 1c

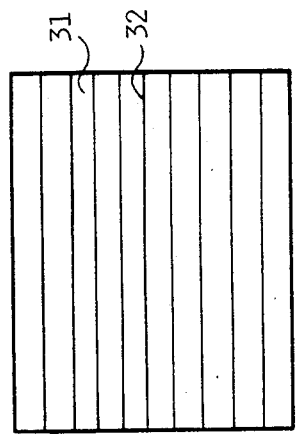
a
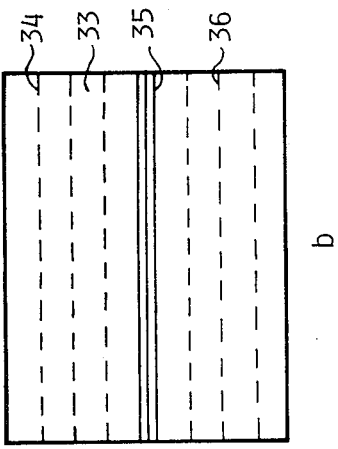
b
FIG. 3
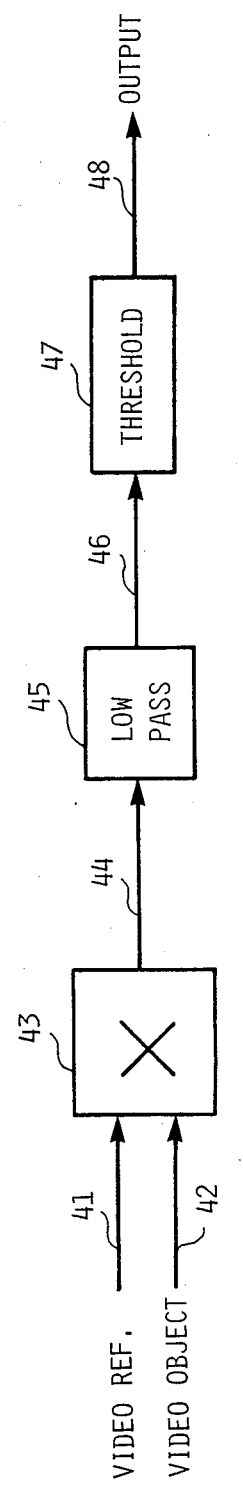
FIG. 4

ARRANGEMENT FOR MEASURING DEPTH BASED ON LENS FOCUSING

BACKGROUND OF THE INVENTION

In any camera system, range to the object may be approximated for objects closer than the hyperfocal distance by observing the sharpness of focus of the image of the object (or a portion thereof) as the camera lens is moved or indexed across its focusing range. At the position of sharpest focus the range of the object (or portion thereof) may be read directly from a calibrated focus adjustment. This can be done whenever there is sufficient detail on the object surface or at its boundary to permit the focusing to be readily apparent to the human eye or to a processor which can determine sharpness of focus based upon fine detail. Sharpness of focus is determined when the spatial high frequency content of a region is maximized or when the percentage modulation at a region is maximized, or both. This can be achieved via many well known digital processing schemes which use the digitized output from a TV camera as input or alternatively, via the use of instantaneous holographic fourier transform techniques which instantly yield spatial frequency information. However, both techniques fail when the object has insufficient surface detail or its edges are gently curving so as to defy the requirements for the presence of some innate structure upon which to judge proper focusing.

SUMMARY OF THE INVENTION

It is an object of the present invention to overcome the prior art disadvantages.

More particularly, it is an object of the present invention to measure the distance from a sensor to a surface which may be devoid of surface detail and provide the three-dimensional co-ordinates of points on the surface relative to the sensor.

In keeping with this object, and with still others which will become apparent as the description proceeds, the invention comprises projecting a pattern of light (not necessarily restricted to visible electromagnetic radiation) onto the surface to be measured; receiving the reflected light from the surface through the same lens used for projection; imaging the reflected pattern on a light sensitive surface; reading out the pattern detected by the light sensitive surface; determining the location in the pattern that maximally correlates with a reference pattern or provides maximum percentage modulation; and reporting the co-ordinates, relative to the sensor, associated with that location within the pattern.

An alternate method of the invention separately projects a pattern of light upon the subject surface with a large depth of focus.

A third method of the invention separately projects a pattern of light upon the subject surface with a narrow depth of focus, the distance to focus being controlled to match the imaging system focal distance.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 1a is an optical schematic of a plan view of an exemplary embodiment of the invention;

FIG. 1b is a side view of the embodiment of FIG. 1a;

FIG. 1c is an axial view of the embodiment of FIG. 1a;

FIG. 3 illustrates an exemplary projection slide pattern and typical image received;

FIG. 4 is a block diagram of one method of processing the received image signal;

DESCRIPTION OF THE PREFERRED EMBODIMENTS

Figure 2:
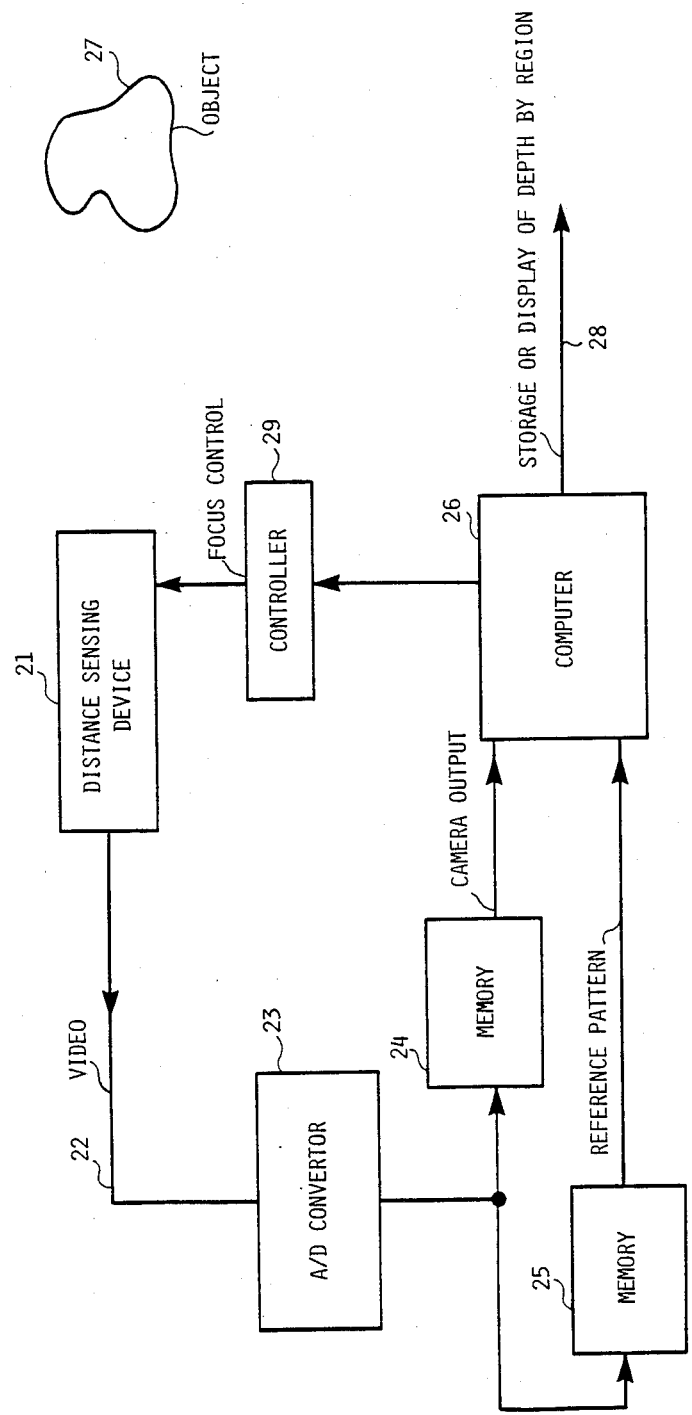
FIG. 2 is a block diagram of the processing for an exemplary embodiment of the invention.

The present invention provides a solution to the failure of prior art devices to measure distance to objects lacking surface detail. The requirement for object detail is obviated by projection of a light pattern containing detail onto the object surface. FIG. 1b shows the addition of projected pattern 125 to the prior art system that only used moveable lens 13 with image sensing surface 17. The pattern 125 on slide 127 to be projected is illuminated by light source 120 with condensing lens 19. Light passing through transparent portions of pattern 125 is partially reflected towards lens 13 by beam splitter 121, the remainder of the light being absorbed by light absorbing surface 14. Lens 13 focuses the image of pattern 125 at a known distance from lens 13. An object 11 at that distance with a sloping surface 12 facing the device will have a sharp image of pattern 125 irradiating its surface at the in-focus distance 123 and a blurred image at further distances 122 or nearer distances 124 as illustrated in FIG. 1a of the system. Reflected light from the pattern projected on surface 12 is then imaged by lens 13 on light sensitive surface 17 of detection device 15. A portion of the light is lost due to the beam splitter 121. An axial view (FIG. 1c) of detector 15 is shown with the received image 18.

It is not necessary to use a single lens 13 and beam splitter 121 to project a pattern 125 upon object 11 though many important advantages are lost. A separate projector working in conjunction with a prior art device can add detail to a featureless surface 12 and thus enable the measurement of distances to points on its surface. The projector may be fixed focus with a depth of field adequate to encompass the measurement range of the distance measuring device or operate cooperatively with the distance measuring device to provide a sharply focused projection image at a distance equal to the in-focus distance of the measuring device. Axial motion 126 of lens 13 provides this simultaneous adjustment for both pattern projection and image reception in the embodiment shown in FIGS. 1a to 1c. This greatly simplifies this simultaneous adjustment and provides the increased accuracy (sensitivity) obtainable by using a sharply focused projected pattern. This sensitivity of focusing is increased because motion 126 of the lens 13 away from its true focus simultaneously defocuses the projection of detail 123 on the object 11 and defocuses the imaging 18 of the object on the pickup device 15. Thus, the sensitivity is doubled. It should be noted that the optical distance of the projection slide 127 from the beam splitter reflecting surface must exactly equal the optical distance from the beam splitter reflecting surface to the detection device surface 17 to ensure that optimum focus is achieved simultaneously for both the projection and imaging paths. Also, the internal optical elements, including the projection slide 127, must be carefully coated and internal structures treated to avoid internal reflections since internally scattered projector light reaching the pickup means 15 will degrade image contrast.

When using the described single lens system of FIG. 1, a processing advantage is obtained because the process of correlation against a known image or alternatively, spatial synchronous detection may be used to process the received image. This occurs because of the reciprocity properties of the optical path from pattern 125 through lens 13 to object 11 and back through lens 13 to detection surface 17. For example, if a flat white screen is set perpendicular to the lens optical axis at the in-focus distance 123, a sharp image of pattern 125 will appear on the screen. Due to lens effects, however, the image will be slightly geometrically distorted. However, since the image of the pattern 125 on the screen is imaged back through the same lens onto the detection device 15, it can be seen that the image on the detection surface 17 must be an exact duplicate of the pattern 125 except for any lens 13 defects that cause a blurring of the image. This occurs because sending the distorted image back through the same lens 13 cancels the distortion. Thus, the image on surface 17 from a flat screen at distance 123 is essentially identical to the projected pattern 125. For any position of lens 13 in the system's working range 126, the screen may be placed at the corresponding in-focus distance 123 and the pattern image onto the detection surface 17 would be invariant. This occurs because the magnification of the projection part of the system is equal to the demagnification of the detection part of the system.

Therefore, the image at the detection surface 17 is invariant except for the blur due to defocusing regardless of where an object is located in its field of view. For maximum distance sensitivity, the system is normally used with the aperture as wide open as possible. The preferred processing required to find regions of sharp focus consists of looking for fixed known patterns in each region of interest using correlation against the known pattern for that region or synchronous detection against the known pattern. Even if the object 11 reflecting surface 12 is not uniformly reflective or featureless, the same processing may be used to assist in focus determination since the image on detection surface 17 will consist of the spatial product of the object surface reflectance and the projected pattern. Thus, except for completely non-reflective object regions, the projected pattern (as modulated by object reflectance) will always appear at the detection surface 17 whenever the region in question is in focus with respect to the current lens 13 adjustment 126. The percent modulation found in each local region may also be used to determine optimum focus.

The projected pattern 125 may consist of any pattern that has mathematical properties providing ease of processing. Such patterns as dot arrays, horizontal bars, vertical bars, angled bars, concentric circles, etc. may be employed.

Similarly, to avoid the contrast diminishing effects of ambient light when using this process, it is anticipated that light source 120 will be a strobelight or a narrow band illumination device (e.g. a laser) with corresponding bandpass filter 129 in the detection path. A shutter 128 may also be used synchronized with light source 120.

Additionally, when a vidicon device which may introduce distortion in readout is used as detector 15, it is expected that a reference pattern will be generated by placing a flat screen at the system's focal distance 123 to derive the actual pattern required when performing the cross correlation or synchronous detection process.

FIG. 2 is a block diagram of one method of the processing required to determine the distance from the sensor 21 to the object 27. The measurement system consists of sensor 21 which has been detailed in FIGS. 1a to 1c, an analog to digital converter 23, memories 24 and 25 for the measured and reference scene data, computer 26 and controller 29. A pattern is projected from sensor 21 onto object 27 and the reflected light converted to a video signal 22 by a TV camera performing the detection function of sensor 21. A/D converter 23 digitizes the video signal which is stored in memory 24. During calibration, memory 25 stores a reference pattern as previously described. Computer 26 cross-correlates the data from memories 24 and 25 and provides output 28 to report the three-dimensional location information of all in-focus surface areas on object 27. Computer 26 also directs controller 29 to focus at a new distance to repeat the process until all surface areas have been measured. If percent modulation is used instead of cross-correlation then memory 25 is not required.

Figure 5:
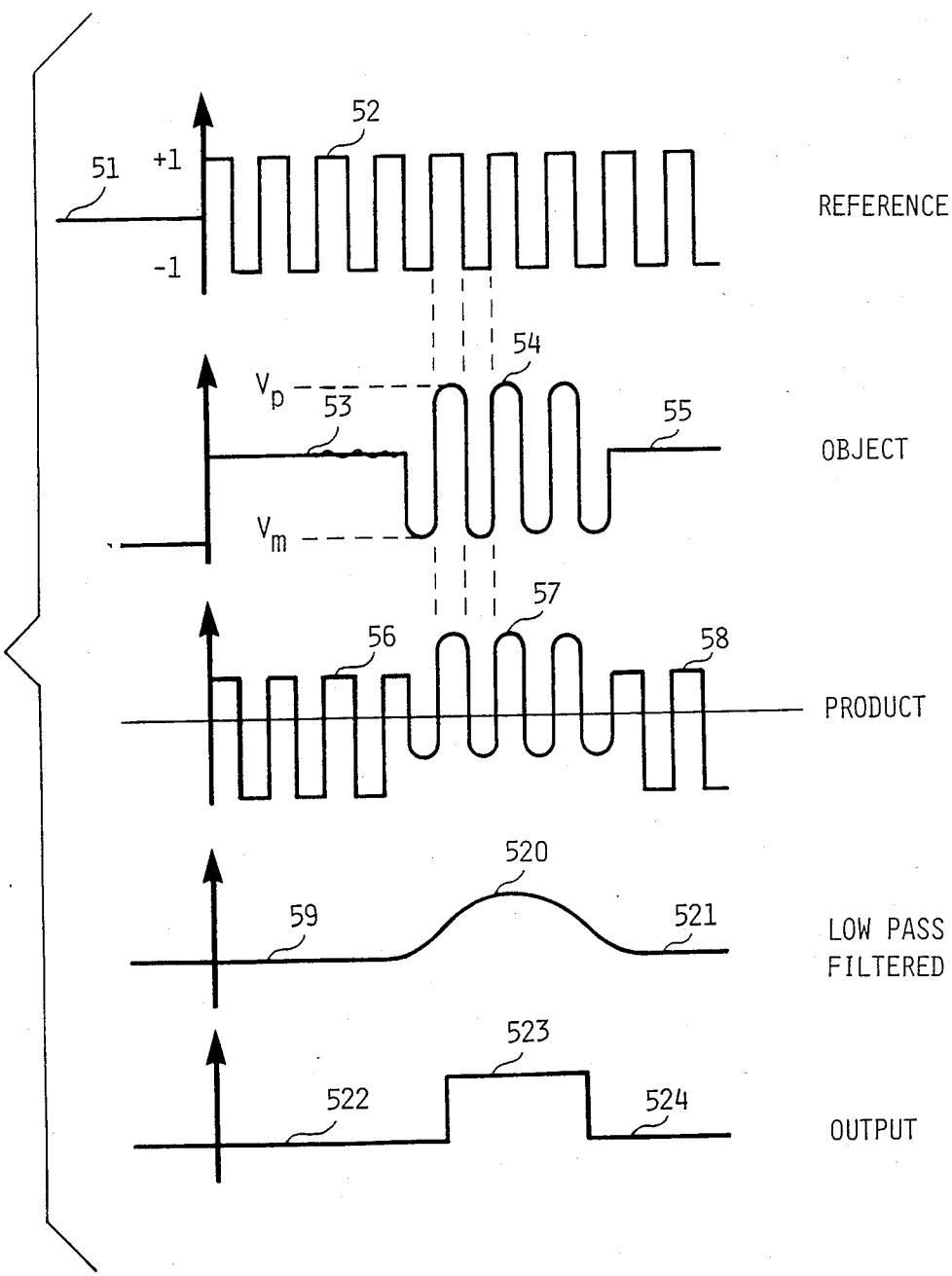
FIG. 5 illustrates typical voltage waveforms in processing the image.

A more detailed explanation will be given using an analog processing method as shown in FIG. 4. Although an analog processing scheme is shown it should be understood that all of the processing may as easily be performed by computer 26 shown in FIG. 2. For the example given, the pattern 125 projected will be assumed to be horizontal bars as shown in (a) of FIG. 3. The small region 123 in focus on object 11 provides image 18 on detector 15, shown enlarged in (b) of FIG. 3. Pattern (a) will have a Video reference signal 41 that will look like waveform 52 in FIG. 5. The reference signal 52 is shown normalized to zero voltage level 51. Video Object signal 42 will have a waveform 54 corresponding to the narrow in-focus region 18 of the image and level 53 and 55 in the blurred, out of focus regions either side of 18. The processing shown in FIG. 4 is typical of both correlation and synchronous detection. The regional cross correlation process 43 does not require sliding the two signals relative to each other because the desired component of the input signal 42 is known to be synchronized to the reference 41. The product 44 of the signals will have a waveform 57 corresponding to the in-focus region 54 and waveforms 56 and 58 corresponding to regions 53 and 55, respectively. Low pass filter 45 output 46 will reveal the location of the in-focus region 18 as an increased level 520 relative to surrounding regions 59 and 521. A threshold circuit 47 can then make discrete decisions 523 for in focus and 522, 524 for out of focus as output 48. The time of decision 523 relates directly to the location 18 on detector 16 which in turn, with the known position of lens 13 in its working range 126 and calibration data for the system, can provide the three-dimensional co-ordinates of the in-focus regions.

Figure 6:
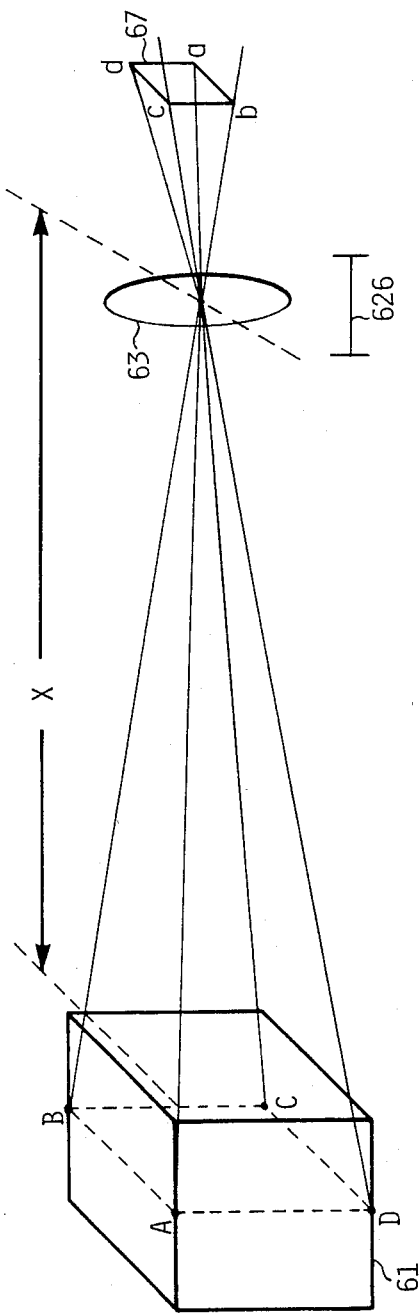
FIG. 6 shows the unique dimensional mapping.

As shown in FIG. 6, the calibrated volume 61 will have a unique in-focus distance, X, measured from lens 63 at each specific location in its range of motion 626. Additionally each off-axis location such A, B, C and D map to unique locations on the imaging surface 67 at a, b, c and d respectively.

Alternate processing, percentage modulation not shown, would operate by computing for each region $100(V_p-V_m)/(V_p+V_m)$ where $V_p$ is the peak voltage of waveform 54 and $V_m$ is the minimum voltage. This function is only a maximum in regions where sharp focus exists.

If the illumination pulse of arbitrary length can be sharply terminated and the detector shutter 128 opened several nanoseconds later, the intense reflections internal to device 21 and at distances closer than the object 11 can be eliminated from reaching the detector 15 and reducing the contrast between bright and dark portions of image 18 and between image 18 and surrounding out-of-focus images.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method of obtaining more than one three-dimensional measurement point on an object, which may be devoid of surface detail, without moving the object or measurement optics comprising the steps of: projecting a pattern of light with a projector from a light source; imaging reflected light from said pattern with a lens on a light sensitive detection surface; said image being sharply focused within a narrow object plane; calibrating by a computer the image of each unique location of the sharply focused narrow object plane; storing the calibration data in a memory; adjusting said object plane focal distance by said lens to intersect the surface of an object to be measured at an intersection, said intersection containing more than one detectable point on said object; processing the received image by said computer to determine in-focus regions; and converting said in-focus region information by said computer into three-dimensional measurement information from said calibration data.

2. An arrangement for obtaining more than one three-dimensional measurement point on an object, which may be devoid of surface detail, without moving the object or measurement optics, comprising: projector means for projecting a pattern of light from a light source; lens means for imaging reflected light from said pattern in a narrow object plane; light-sensitive detector means for parallel detection of light in regions of said image; memory means for storing calibration data; control means for adjusting said object plane focal distance with said lens means to intersect the surface of an object to be measured at an intersection, said intersection containing more than one detectable point on said object; computer means for processing said detected image to determine in-focus regions; said computer means reporting three-dimensional measurements from said calibration data corresponding to said in-focus regions.

3. An arrangement as defined in claim 2, wherein said projected light pattern is fixed focus with a depth of focus encompassing the effective range of the arrangement.

4. An arrangement as defined in claim 2, wherein said projected light pattern is narrowly focused at the same distance as said object plane focal distance.

5. An arrangement as defined in claim 2, wherein said projected light pattern and said imaged reflected light are focused by a single focusing means.

* * * * *